United States Patent [19]

Matchett

[11] Patent Number: 5,037,579
[45] Date of Patent: Aug. 6, 1991

[54] HYDROTHERMAL PROCESS FOR PRODUCING ZIRCONIA SOL

[75] Inventor: Stephen A. Matchett, Lisle, Ill.

[73] Assignee: Nalco Chemical Company, Naperville, Ill.

[21] Appl. No.: 479,023

[22] Filed: Feb. 12, 1990

[51] Int. Cl.$^5$ .................. B01J 13/00; C01G 25/02
[52] U.S. Cl. .................. 252/313.1; 423/608; 501/12; 501/103
[58] Field of Search .................. 423/608; 501/103, 12, 501/33, 34; 502/8; 252/313.1

[56] References Cited

U.S. PATENT DOCUMENTS

| | | | |
|---|---|---|---|
| 2,984,628 | 5/1961 | Alexander et al. | 252/313.1 |
| 4,159,205 | 6/1979 | Miyahara et al. | 423/608 |
| 4,349,456 | 9/1982 | Sowman | 501/12 |
| 4,412,064 | 10/1983 | Hinman | 528/9 |
| 4,612,138 | 9/1986 | Keiser | 252/313.2 |
| 4,619,817 | 10/1986 | Stambaugh et al. | 423/266 |
| 4,719,091 | 1/1988 | Wusirika | 423/82 |
| 4,722,833 | 2/1988 | Kato | 423/608 |
| 4,784,794 | 11/1988 | Kato | 423/70 |
| 4,927,622 | 5/1990 | Jade | 423/608 |

FOREIGN PATENT DOCUMENTS

| | | | |
|---|---|---|---|
| 58-079818 | 5/1983 | Japan | 423/608 |
| 62-162624 | 7/1987 | Japan . | |
| 62-235081 | 9/1987 | Japan . | |
| 64-079015 | 3/1989 | Japan . | |
| 64-83520 | 3/1989 | Japan | 423/608 |

OTHER PUBLICATIONS

Peters et al., Chemical separations and Measurements, 1974, p. 587.
Handbook of Chemistry and Physics, 58th Edition, 1977-1978, CRC Press, p. B-178.
McCabe & Smith, Unit Operations of Chemical Engineering, 1976, p. 426.
Chunting Li and Iwao Yamai, "Formation of Acicular Monoclinic Zirconia Particles under Hydrothermal Conditions", *J. Am. Ceramic Soc.*, vol. 72, No. 8, (1989), pp. 1479-1482.
Tani et al., "Hydrothermal Preparation of Ultrafine Monoclinic ZrO$_2$ Powder", *Comm. of the Am. Ceramic Soc.*, Dec. 1981, p. C-181.

*Primary Examiner*—Michael L. Lewis
*Assistant Examiner*—Ngoc-Yen M. Nguyen
*Attorney, Agent, or Firm*—Ailes, Ohlandt & Greeley

[57] ABSTRACT

The present invention provides a novel hydrothermal process for producing zirconia sol comprising the following steps: mixing zirconium acetate with diluted glacial acetic acid to form a zirconium acetate/glacial acetic acid solution, wherein the molar ratio of glacial acetic acid to zirconium acetate as zirconia is in the range between about 7-20; and heating the zirconium acetate/glacial acetic acid solution to a temperature of at least 160° C., thereby forming a zirconia sol.

20 Claims, No Drawings

HYDROTHERMAL PROCESS FOR PRODUCING ZIRCONIA SOL

The unique process of the present invention relates to the production of zirconia ($ZrO_2$) sol and its concentration to levels acceptable for use by the advanced ceramics industry and also for use in investment castings. The present invention provides a novel hydrothermal process for producing a zirconia sol comprising the following steps: mixing zirconium acetate with diluted glacial acetic acid to form a zirconium acetate/glacial acetic acid solution, wherein the molar ratio of glacial acetic acid to zirconium acetate as zirconia is in the range between about 7-20; and heating the zirconium acetate/glacial acetic acid solution to a temperature of at least 160° C., thereby forming a zirconia sol.

BACKGROUND OF THE INVENTION

The success of the advanced ceramics industry revolves around the ability to reproducibly make high quality pieces. These pieces are the result of a long series of production steps, e.g., powder synthesis, precipitation, drying/calcining, dispersion, green body formation, binder burnout, and sintering. The quality of the product from each of the aforementioned steps is limited by the quality of the product of the previous step. As such, the synthesis and characteristics of the ceramic powder sets the upper limit for the quality of the final article produced.

One of the most desirable powder properties is the ability to pack efficiently. This ability controls both the green and the fired density of the product, influences microstructural development, and controls the degree of shrinkage upon sintering. For many advanced ceramic applications, the ideal powder would be composed of monodispersed, spherical, submicron particles exhibiting minimal agglomeration.

Powders of most metal oxides are commercially available from a variety of sources. These metal oxide powders, however, suffer from comparatively larger particle sizes (e.g., 0.5 to several microns), polydispersity, and the presence of particle agglomerates. The powders are additionally restricted by their inability to mix on the "molecular level", in the formation of the more complex composite ceramics.

The present inventor believes that colloidal sols of zirconium oxide can be substituted for powdered zirconium oxides in the production of advanced ceramic pieces. The advantage of using a colloidal preparation is the production of monodispersed particles in the submicron range (i.e., down to several nanometers). As a colloidal product the agglomeration associated with a dried/calcined product is avoided by continuous dispersion in solution. This gives sols increased ease of use for surface coatings and gives them the capability for the "molecular mixing" necessary for custom composite formulation.

Various attempts have been made to grow zirconia particles from solution, such as that set forth in Japanese Patent No. 87/162,624; Blier, A. and Cannon, R.M., "Nucleation and Growth of Uniform m-Zro2", *Better Ceramics Through Chemistry II: Proceedings of the Materials Research Society Symposia Proceedings*, Apr. 15-19, 1986; and U.S. Pat. No. 4,612,138 (B. Keiser), issued Sept. 16, 1986.

Japanese Patent No. 87/162,624 discloses the production of fibrous bundle-shaped coagulated particles of monoclinic zirconia crystals by agglomerating monoclinic zirconia crystals along the C axis to give microthin fiber shape. These crystals are prepared by hydrothermal reaction of soluble zirconium salt or compounds containing 0.1-2.0 mol/L of zirconium and 0.2-2.0 mol/L of $SO_4^{2-}$ with an acidic aqueous solution containing 0.05-1.5 mol/L of $Mg^{2+}$ or $NH_4+$ at 120-300° C. Thus, 16 g $ZrOCl_2 8H_2O$ was dissolved in water, then mixed with 10 mL concentrated $NH_4OH$ to form a hydroxide precipitate, filtered, and washed. The resulting precipitate, still containing $NH_4OH$ traces, was dissolved in 36 N $H_2SO_4$ to give a solution containing 0.25 mol/L of Zr, 0.5 mol/L of $SO_4^{2-}$, and 0.1 mol/L of $NH_4+$. The solution was heated in an autoclave at 150° for 2 days to react and form white fibrous bundle-shape zirconia particles (width 1000A and length 8000 A). The reactions of each example were run in TEFLON lined reactors.

The Blier et al. article discloses the synthesis of aggregate particles from $Zr(O)(NO_3)_2$ with most of the synthesis under non-hydrothermal conditions. The process runs at a much lower concentration and for a longer period of time, i.e., 24 to 72 hours, than the present invention.

The Keiser patent discloses a process for forming a stable acidic and alkaline metal oxide sol by hydrolyzing a metal salt precursor in the presence of a stabilizing component chosen from the group consisting of surfactants having an HLB of at least 8, dispersing carboxylate polymers, and mixtures thereof, then alkalizing by adding a water-soluble amine compound, preferably diethylaminoethanol. This method produces a product with low weight percent Zr in the product.

The following patent and articles disclose hydrothermal production of zirconia particles as precipitates: Somiya, S. et al., "Hydrothermal Processing of Ultrafine Single-Crystal Zirconia and Zirconia Powders with Homogeneous Dopants", *Advances in Ceramics*, vol. 21, The American Ceramic Society, Inc., 1987; U.S. Pat. No. 4,619,817 (Stanbaugh et al.), issued Oct. 28, 1986; and Tani, E. et al., "Hydrothermal Preparation of Ultrafine Monoclinic $ZrO_2$ Powder", *Communications of the America Ceramic Society*, C-181, Dec. 1981.

The following patents disclose various high solids methods for forming zirconia sols from $ZrOCl_2 8H_2O$: U.S. Pat. No. 2,984.628 (Alexander et al.). issued May 16. 1961; and EP Patent Application No. 229,657 (Kato), issued July 22, 1987. The Alexander et al. patent discloses the formation of a 20% solids suspension (66% in the dispersed phase) by autoclaving for 4 hours at 150° C. In Kato, the mixture was sealed in a PTFE container and heated in an autoclave at 200° C. for 5 days.

U.S. Pat. No. 4,719,091 (Wusirika), issued Jan. 12, 1988, discusses the preparation of zirconia crystals, but this method takes between 2-5 days to complete and uses different starting materials than the present invention.

The present invention provides the following advantages over the aforementioned patents and articles:

(1) The present invention uses a different starting material, i.e., a zirconium acetate solution, which buffers the pH in a range where the use of TEFLON or expensive metallurgy is not required. Running this reaction using starting materials such as $ZrOCl_2 8H_2O$ or zirconium sulfate (involving $Cl^{31}$ and sulfate ions) led to corrosion of standard metallurgy, e.g., 316 stainless. Even in a glass-lined reactor the stirring hardware corroded badly. In addition, this weaker organic acid decreases safety hazards and burns off cleanly, i.e., no $NO_x$ or $SO_2$ production.

(2) The present invention greatly reduces processing time. Other conventional processes for producing similar particle morphologies take between 2-5 days; whereas the present invention requires only about 5 hours.

(3) The present invention can produce a monodispersed sol from high initial solids loading, i.e., zirconium acetate is present in an amount between 0.2 to 0.65 moles/liter based on zirconia.

(4) The resultant zirconia sol can be concentrated above 30 weight percent with stability beyond two months.

(5) The process of the present invention is controlled by the addition of a large molar excess of acetic acid, not just as a pH control, but also for producing a stable end product.

The present invention therefore overcomes the abovementioned deficiencies, as well as provides additional advantages which shall become apparent as described below.

SUMMARY OF THE INVENTION

The present invention provides a novel hydrothermal process for producing a zirconia sol comprising the following steps: mixing zirconium acetate with diluted glacial acetic acid to form a zirconium acetate/glacial acetic acid solution, wherein the molar ratio of glacial acetic acid to zirconium acetate as zirconia is in the range between about 7-20; and heating the zirconium acetate/glacial acetic acid solution to a temperature of at least 160° C., thereby forming a zirconia sol.

An additional object of the present invention is that zirconium acetate is present at a concentration in the range between about 0.1 to about 0.8 moles/liter based on zirconia. Also, the heating step occurs for a period in the range between about 60-300 minutes. Depending on the nature of the starting material, heating beyond 300 minutes will destabilize the product or have little effect.

Optionally, the heating step is followed by cooling the zirconia sol to ambient temperature. The cooling step is optionally followed by diafiltration of the zirconia sol, whereby unreacted zirconium acetate, unwanted ionic species and excess acetic acid are removed. And the diafiltration step is optionally followed by ultrafiltration of the zirconia sol, whereby a concentrated zirconia sol is produced.

It is also an object of the present invention that the zirconia sol comprises particles having an average ultimate particle size in the range between about 60-225 nanometers. That is, the particles are aggregates of subunits having an average size in the range between about 2-3 nanometers.

Another object of the present invention is a process for producing primarily monodispersed zirconia sol comprising the following steps: (1) mixing zirconium acetate, the zirconium acetate being formed from a zirconium salt containing a removable anion, with diluted glacial acetic acid to form a zirconium acetate/glacial acetic acid solution, wherein the molar ratio of glacial acetic acid to zirconium acetate as zirconia is in the range between about 10-20 and the molar concentration of zirconium acetate based on zirconia is in the range between about 0.20-0.65, and wherein the combination of the molar ratio of glacial acetic acid to zirconium acetate as zirconia and the molar concentration of zirconium acetate based on zirconia falls within the desired boundaries of the response surface statistically generated from the data in table 4; and (2) heating the zirconium acetate/glacial acetic acid solution to a temperature of at least 160° C., thereby forming a zirconia sol with a polydispersity less than 0.06 and a particle size in the range between about 60-100 nanometers. The zirconium salt is preferably acidic derived zirconium carbonate.

The present invention may also include many additional features which shall be further described below.

DESCRIPTION OF THE PREFERRED EMBODIMENTS

The unique process of the present invention relates to the production of zirconia sol and its concentration to levels more acceptable for use by the advanced ceramics industry. The process produces a zirconia sol consisting of aggregates of 2-3 nanometer subunits and yielding an ultimate particle size of 60-225 nanometers.

The present inventor has discovered that the response surfaces for particle size and polydispersity are a function of:

(a) the concentration of zirconium acetate present (based on zirconia);

(b) the molar ratio of glacial acetic acid used to zirconium acetate as zirconia;

(c) the duration of the reaction; and (d) the nature of the starting material.

This novel hydrothermal process for producing zirconia sol comprises the following steps: mixing zirconium acetate with diluted glacial acetic acid, wherein the molar ratio of the glacial acetic acid to zirconium acetate as zirconia is in the range between about 7-20; and heating the zirconium acetate/glacial acetic acid solution to a temperature of at least 160° C., thereby forming a zirconia sol.

The concentration of the zirconium acetate solution used is calculated based on its percent zirconia content. The zirconium acetate is usually present in a concentration range between about 0.1 to about 0.8 moles/liter based on zirconia. The diluted glacial acetic acid is preferably a mixture of glacial acetic acid and deionized water. The zirconium acetate/glacial acetic acid solution may have a pH in the range between about 1.9 to about 2.6.

The source of zirconium acetate solution may optionally be from a zirconium salt containing a removable anion, such as, acidic or basic derived zirconium carbonate. Moreover, any conventional means of forming zirconium acetate is contemplated hereby.

Since larger particle (60-220 nanometers) zirconia sols are not produced until the critical threshold temperature of 160° C. is reached, it is necessary that the heating step occur at a temperature of at least 160° C. The heating step should continue for about 60-300 minutes and take place in a pressure capable container (e.g., a glass-lined autoclave). Additional heating can destabilize the sol due to excessive particle growth in some formulations.

Depending upon the desired concentration and application of the zirconia sol, the steps of mixing and heating the zirconium acetate/glacial acetic acid solution can be followed by cooling the resultant zirconia sol to ambient temperature, removing unreacted zirconium acetate, unwanted ionic species and excess acetic acid from the sol by diafiltration, and concentrating the sol by ultrafiltration. It is particularly desirable for applications in advanced ceramics to concentrate the zirconia sol as high as possible. This process allows colloidal stability even in excess of 30 weight percent solids. Higher solids are also possible with proper pH control.

A monodispersed zirconia sol according to the present invention may also be formed by: (1) mixing zirconium acetate, the zirconium acetate being formed from a zirconium salt containing a removable anion, with diluted glacial acetic acid to form a zirconium acetate/-glacial acetic acid solution, wherein the molar ratio of glacial acetic acid to zirconium acetate as zirconia is in the range between about 10-20 and the molar concentration of zirconium acetate based on zirconia is in the range between about 0.20-0.65, and wherein the combination of the molar ratio of glacial acetic acid to zirconium acetate as zirconia and the molar concentration of zirconium acetate based on zirconia falls within the desired boundaries on the response surface as statistically generated from the data in table 4 as set forth hereinafter; and (2) heating the zirconium acetate/glacial acetic acid solution to a temperature of at least 160° C., thereby forming a zirconia sol with a polydispersity, as defined for quasi-elastic light scattering (QELS), of less than 0.06 and a particle size in the range between about 60-100 nanometers.

The zirconium salt is preferably acidic derived zirconium carbonate, since basic derived zirconium carbonate causes continued particle growth with time and the formation of particles with a polydispersity greater than 0.06.

An example of one preferred method for producing monodispersed zirconia sol according to the present invention is to mix zirconium acetate with diluted acetic acid, wherein the zirconium acetate is present in an amount of about 0.53M based on zirconia and the molar ratio of the glacial acetic acid to zirconium acetate as zirconia is about 11.5, and heat the zirconium acetate/-glacial acetic acid solution to a temperature between about 160-165° C. for a period of about 300 minutes.

The polydispersity, as defined by quasi-elastic light scattering (QELS) measurements, of the zirconia sol is preferably in the range between about 0 to 0.30; wherein 0 represents perfect monodispersity. The zirconia sol is predominantly a monodispersed sol when the polydispersity is below about 0.06.

The present invention can best be described by referring to the below examples. In the following examples various commercially available zirconium acetate solutions were used, each described as 22 weight % zirconia. Since the true molecular formula of the aqueous acetate is an oxy-, hydroxy-, acetato-, hydrate of poorly defined stoichiometry, the starting concentrations of zirconium acetate solution are calculated in moles/liter of zirconia. Small scale pressurized reactions were run in Model 4561, a 300 mL Parr Bomb reactor (316 stainless steel), or Model 4563, a 600 mL Parr Bomb reactor (316 stainless steel) fitted with a 4842 controller. Scale-ups to 2 gallons were performed in an Autoclave Engineers, Inc. Model AE autoclave (316 stainless steel).

Diafiltration was performed with an Amicon 6010, a 20 liter reservoir, using Amicon's 65 mL, 400 mL, and 2500 mL stirred cells as needed. The membranes used were the appropriately sized Amicon XM300's with a molecular weight cutoff of greater than 300,000. Pressures in the cells were held between 35 and 50 psi, depending on flow rates. All samples were diafiltered until the reported number of equivalent volumes of permeate were collected, using deionized make-up water throughout. Ultrafiltration was performed in the same cell by removing the source of make-up water.

EXAMPLE I ([Zirconium Acetate] = 0.53 moles/liter as $ZrO_2$, Molar Ratio of [Glacial Acetic Acid]/[$ZrO_2$] = 11.5)

In a typical preparation, 43.8 g (0.73 moles) of glacial acetic acid was stirred into 51 mL of deionized water, To this was added 35.6 g of a 22 wt.% (based on zirconia) solution of zirconium acetate to give a homogeneous solution of pH = 2.2. The resulting solution was stirred for 10 minutes at room temperature to ensure homogeneity prior to loading it into a 300 mL Parr Bomb under air. The temperature was raised to 163-165° C. over the course of 40 minutes and held constant by a controller for the duration of the reaction. This developed a pressure head of 90-100 psi in the reactor. After 300 minutes, the reaction was quenched by cooling the reactor in an ice bath until the contents reached ambient temperature (35 to 45 minutes). The resulting milky white sol was loaded into the 400 mL diafiltration cell. Unreacted zirconium acetate and excess acetic acid were reduced by diafiltration, collecting 6 equivalent volumes of permeate. The product was then concentrated to 320 mL via ultrafiltration. Particle size was measured using a Quasi-Electric Light Scattering (QELS) measurement. The particle size was 0.084 microns at a polydispersity (QELS) of 0.04998. Furnace combustion showed the sol to be 2.18 weight % solids.

EXAMPLES 2-5

A series of four reactions were run using the conditions defined in Table 1 below and the procedure outlined above in Example 1.

TABLE 1

| EX. | Zr Acetate (mol./liter) as $ZrO_2$ | Ratio (mol./liter) | Duration (Min) | QELS Particle Size | QELS Polydis. |
|---|---|---|---|---|---|
| 2 | 0.56 | 10.5 | 300 | 0.0922 | 0.0830 |
| 3 | 0.56 | 7.7 | 300 | 0.1382 | 0.1150 |
| 4 | 0.53 | 11.5 | 300 | 0.0830 | 0.0498 |
| 5 | 0.48 | 12.0 | 300 | 0.0863 | 0.0391 |

QELS Particle Size is recorded in microns

EXAMPLE 6

([Zirconium Acetate] = 0.44 M as $ZrO_2$, Molar Ratio of [Glacial Acetic Acid]/[$ZrO_2$] = 9.6)

A dilution of 124.8 g of glacial acetic acid with 280 mL of deionized water, followed by the addition of 120.02 g of zirconium acetate solution (26.4 g as zirconia), gave a homogeneous solution of pH = 2.33. The blended reactants were loaded into a 600 mL Parr Bomb and brought to 160-165° C. The reaction was run for 3.5 hours at reaction temperature and then quenched by cooling the reactor with an ice bath. The product, a milky white suspension, was diafiltered in a 2500 mL cell to remove 14 equivalent volumes of permeate before concentrating to 450 mL via ultrafiltration. The product had a final pH of 3.56 and a conductivity of 317 micro MHO's. Muffle furnace combustion showed 4.17 wt.% solids. QELS gave the particle size as 0.0823 microns at a polydispersity of 0.0420.

EXAMPLE 7

([Zirconium Acetate]=0.43 M as ZrO$_2$,

Molar Ratio of [Glacial Acetic Acid]/[ZrO$_2$]=10)

A dilution of 1511 g of glacial acetic acid with 3.36 liters of deionized water, followed by the addition of 1440 g of zirconium acetate solution, produced a homogeneous solution of pH 2.2. The starting materials were loaded into an unlined 2 gallon autoclave and brought to 165° C. The reaction was run at 165° C. for 3.5 hours and then quenched by turning off the heater and cooled to ambient over 45 minutes. The product was drained from the bottom of the reactor into a bucket and then split between two, 2500 mL cells. The product was thereafter diafiltered to remove 10 liters of permeate from each cell (5 equivalent volumes). The product had an off blue/white color as discharged from the reactor which was slightly improved after diafiltration. Diafiltration was followed by ultrafiltration of the product to 1.5 liters. This resulted in a zirconia sol having a percent solids of 11.75 wt.%.

EXAMPLE 8

Initial hydrothermal treatment of dilute (0.15M as zirconia) aqueous zirconium acetate solutions resulted in only precipitated products. As the pH of the starting materials was adjusted downward with glacial acetic acid, increased settling stability was observed. Heating an acidified (pH <2.5) 0.15M aqueous solution of zirconium acetate to 160-170° C., in a pressure reactor (100 psi pressure head), gave an opalescent sol. When the temperature was held below 160° C., no opalescence was observed up to 13 hours. Diafiltration reduced the sol solution conductivity to between 700 and 400 micro MHO's, and resulted in a product with at least a two month settling stability when the zirconium acetate was formed from an acidic derived zirconium carbonate.

EXAMPLES 9-15

(Effect of Reduced Temperatures on ZrO$_2$ Sol Formation)

A 100 mL of a zirconium acetate solution mixed with diluted glacial acetic acid and having a pH =2.27 was placed in a 300 mL Parr Bomb reactor which was heated to a temperature of ~140-155° C. Samples were taken at the time and conditions set forth below in Table 2.

TABLE 2

| Examples | Time | Temperature | Pressure | Appearance |
|---|---|---|---|---|
| 9 | 0.5 hr | 156° C. | 60 psi | clear |
| 10 | 1.0 hr | 147° C. | 50 psi | clear |
| 11 | 1.5 hr | 147° C. | 50 psi | clear |
| 12 | 2.25 hr | 147° C. | 50 psi | clear |

After 3 hours the run was stopped and allowed to equilibrate to room temperature. The final solution was slightly discolored but clear. This solution was diafiltered to remove 950 mL of permeate and then concentrated by ultrafiltration to 75 mL. The resultant solution was completely transparent indicating that the desired zirconia sol was not produced under the above temperature conditions. Transmission Electron Micrographs confirmed the absence of the desired particle formation.

Thereafter, a new set of samples was prepared and run at slightly higher heating temperatures. The zirconium acetate solution (25.04 g; 5.51 g as zirconia) was diluted with 75 mL of deionized water to give a solution with a pH =3.59. This solution was then adjusted to a pH of 2.23 by the addition of 40 mL of glacial acetic acid ([Zirconium acetate =0.34 M as zirconia; Molar Ratio of [Glacial Acetic Acid]/ZrO$_2$]= 15.6). The total volume of the reaction mixture was loaded into a 300 mL Parr Bomb reactor. The temperature was gradually raised to 170° C. The temperature was thereafter maintained at between 170-176° C. for 1.5 hours with the following observations:

TABLE 3

| Examples | Time | Temperature | Pressure | Appearance |
|---|---|---|---|---|
| 13 | 35 min | 176° C. | 90 psi | opalescence |
| 14 | 1 hr | 175° C. | 95 psi | opalescence |
| 15 | 1.5 hr | 175° C. | 95 psi | opalescence |

After 1.5 hours the reaction was stopped and water cooled over the course of 25 minutes. The solution had a pH of 1.8 and a conductivity of 21,000 micro MHO's Diafiltration resulted in 920 mL of permeate and the solution was then concentrated to 132 mL via ultrafiltration. The concentrated sol had a pH of 2.76 and a conductivity of 560 micro MHO's The percent solids was 3.12% as determined in a furnace combustion.

EXAMPLES 16-51

Variation of [Zr], [Acid]and the duration of the reaction led to differences in the size of the particle and the polydispersity of the resulting sol. Table 4 below lists the reaction conditions with the corresponding size and polydispersity data for a series of zirconia sol syntheses. From the data provided below several response relationships are apparent:

(a) The final size of the particle is a function of initial concentration of zirconium acetate, the molar ratio of glacial acetic acid to zirconium acetate as zirconia, and the duration; and (b) Polydispersity decreases with time but the time interval required to reach monodispersity varied with reaction conditions.

A quadratic response surface model (Box-Behnken) was constructed from the following ranges:

Time: 60-400 minutes

[Zr]: 0.1-0.8 Moles/Liter

Ratio: 10-20

Size: 0.06-0.300 microns

Polydis.: 0.03-0.30 generating a series of experiments to be run at statistically determined values of the three variables. The worksheet, including the results of the performed experiments, appears as Table 4 below.

TABLE 4

[FULL FACTORIAL EXPERIMENTAL DESIGN]

| EX. | [ZrO$_2$] Mol/L | Ratio * | Duration (min) | pH | Size (mic.) | Polydis. |
|---|---|---|---|---|---|---|
| 16 | 0.30 | 14.69 | 60 | 2.10 | 0.0620 | 0.1242 |
| 17 | 0.30 | 14.69 | 85 | 2.10 | 0.0654 | 0.0593 |
| 18 | 0.30 | 14.69 | 125 | 2.10 | 0.0717 | 0.0508 |
| 19 | 0.30 | 14.69 | 210 | 2.10 | 0.0757 | 0.0799 |
| 20 | 0.30 | 14.69 | 270 | 2.10 | 0.0816 | 0.0421 |
| 21 | 0.30 | 14.69 | 300 | 2.10 | 0.0820 | 0.0598 |
| 22 | 0.30 | 14.64 | 105 | 2.20 | 0.0779 | 0.1179 |
| 23 | 0.30 | 14.64 | 135 | 2.20 | 0.0806 | 0.0981 |
| 24 | 0.30 | 14.64 | 200 | 2.20 | 0.0881 | 0.0973 |
| 25 | 0.30 | 14.64 | 290 | 2.20 | 0.0850 | 0.0866 |
| 26 | 0.45 | 15.00 | 105 | 1.90 | 0.0437 | 0.2704 |
| 27 | 0.10 | 15.00 | 180 | 2.38 | 0.0691 | 0.1393 |
| 28 | 0.45 | 20.00 | 190 | 1.68 | 0.1271 | 0.1185 |
| 29 | 0.80 | 10.00 | 440 | 2.01 | 0.0652 | 0.0383 |

TABLE 4-continued

[FULL FACTORIAL EXPERIMENTAL DESIGN]

| EX. | [ZrO$_2$] Mol/L | Ratio * | Duration (min) | pH | Size (mic.) | Polydis. |
|---|---|---|---|---|---|---|
| 30 | 0.80 | 10.00 | 300 | 2.01 | 0.0394 | 0.1527 |
| 31 | 0.10 | 20.00 | 365 | 2.29 | 0.0736 | 0.0705 |
| 32 | 0.10 | 20.00 | 300 | 2.29 | 0.0719 | 0.0960 |
| 33 | 0.10 | 20.00 | 60 | 2.29 | 0.0842 | 0.1969 |
| 34 | 0.45 | 15.00 | 300 | 1.97 | 0.0810 | 0.0626 |
| 35 | 0.43 | 10.00 | 210 | 2.20 | 0.0845 | 0.0483 |
| 36 | 0.29 | 9.90 | 10 | 2.30 | 0.1276 | 0.1844 |
| 37 | 0.80 | 15.00 | 300 | 1.67 | 0.1559 | 0.2077 |
| 38 | 0.45 | 10.00 | 300 | 2.24 | 0.0903 | 0.0444 |
| 39 | 0.80 | 10.00 | 180 | 2.10 | 0.0000 | |
| 40 | 0.80 | 20.00 | 180 | | | |
| 41 | 0.45 | 15.00 | 180 | 1.97 | 0.0704 | 0.0479 |
| 42 | 0.45 | 15.00 | 180 | 1.90 | 0.0586 | 0.0428 |
| 43 | 0.10 | 10.00 | 180 | 2.30 | 0.4000 | |
| 44 | 0.10 | 15.00 | 300 | 2.38 | 0.0652 | 0.0994 |
| 45 | 0.10 | 20.00 | 180 | 2.29 | 0.0689 | 0.1272 |
| 46 | 0.45 | 15.00 | 180 | 1.94 | 0.0723 | 0.0416 |
| 47 | 0.80 | 15.00 | 60 | 1.67 | 0.1258 | 0.2227 |
| 48 | 0.45 | 20.00 | 300 | 1.68 | 0.1237 | 0.0754 |
| 49 | 0.10 | 15.00 | 60 | 2.38 | 0.0736 | 0.2353 |
| 50 | 0.45 | 20.00 | 60 | 1.68 | 0.1103 | 0.1159 |
| 51 | 0.45 | 10.00 | 60 | 2.24 | 0.0905 | 0.2130 |

Note:
Blank spaces indicate an unmeasured value.
All reactions were run with Zr acetate made from acidic derived zirconium carbonate.
*Ratio expressed as [Acid]/[ZrO$_2$].

The data is table 4 above was generated from a full factorial statistical experimental design. The design can be used to generate a response surface relating the variables of molar ratio of glacial acetic acid to Zr acetate as zirconia and molar concentration of Zr acetate based on zirconia to the responses of particle size and polydispersity. The response surface sets forth the boundaries of the preferred embodiment (small particle, monodispersed sol). An appropriate combination as defined by the response surface of the molar ratio of glacial acetic acid to Zr acetate as zirconia, within a range of 10-20, with the molar concentration of Zr acetate as zirconia, within the range of 0.20-0.65, results in a zirconia sol having a particle size between 0.06 and 0.100 nm with a QELS polydispersity of less than 0.06. Areas outside these boundaries produced zirconia sol of larger particle size and varying polydispersity.

EXAMPLE 52

(Use of Zr acetate solution derived from Zr carbonate)

A dilution of 43.89 g of glacial acetic acid with 51.02 g of deionized water, followed by the addition of 35.63 g of zirconium acetate solution prepared from acidic derived zirconium carbonate, gave a homogeneous solution. The resultant product was removed from the reactor and diluted. The product was diafiltered to remove ~800 mL of permeate and then concentrated to 250 mL via ultrafiltration. The QELS particle size was 68.22 and QELS polydispersity was 0.036. The use of acidic derived zirconium carbonate to form the zirconium acetate solution gave the preferred embodiment. Conversely, base derived zirconium carbonate produced a zirconium acetate which resulted in the formation of larger particle sizes (i.e., 100-225 nm).

EXAMPLE 53

(Concentration of ZrO$_2$ via Ultrafiltration)

350 mL of a zirconia sol product having a percent solids of approximately 11.4 wt.% was concentrated by ultrafiltration, removing approximately 120 mL of permeate. The concentrated product had a specific gravity of 1.452 and a weight percent solids of 36.13.

EXAMPLE 54

(Addition of Acid to Concentrated ZrO$_2$ Sol)

350 mL of a zirconia sol product having a percent solids of approximately 11.4 wt.% was concentrated by ultrafiltration, removing approximately 140 mL of permeate. The diafiltration cell was reloaded with an additional 140 mL of sol and then ultrafiltration continued. After another 60 mL of permeate was removed the product was removed. The concentrated product had a specific gravity of 1.482 and a weight percent solids of 38.3.

The sol which was concentrated to 38.3 wt.% began to thicken over time. It was discovered that the gelation or thickening of the concentrated sol could be reversed by the addition of an acid, e.g., glacial acetic acid. The acid's effect on pH probably contributes strongly to reversing the gelation. This type of control is particularly useful for coating applications.

EXAMPLE 55

(Stability of Concentrated ZrO$_2$ Sol at Lower pH)

Two (2) liters of a zirconia sol product having a percent solids of 11.4 wt.% was adjusted from a pH of 4.57 to a pH of 3.35 with approximately 15 mL of glacial acetic acid. This pH adjusted sol was thereafter concentrated to approximately 1280 mL by ultrafiltration in a 2.5 liter diafiltration cell. The concentrated sol product had a pH of 3.83, a specific gravity of 1.5515 and a weight percent solids of 42.3.

While I have shown and described several embodiments in accordance with my invention, it is to be clearly understood that the same are susceptible to numerous changes apparent to one skilled in the art. Therefore, I do not wish to be limited to the details shown and described but intend to show all changes and modifications which come within the scope of the appended claims.

What is claimed is:

1. A process for producing a zirconia sol having a polydispersity in the range between about 0.03-0.30, an average particle size in the range between about 60-225 nanometers, and wherein said particles are an aggregate of subunits having an average size in the range between about 2-3 nanometers, comprising the following steps:
    mixing zirconium acetate with a diluted solution of glacial acetic acid to form a composition consisting essentially of zirconium acetate/glacial acetic acid solution, wherein the ratio of the molar concentrations o glacial acetic acid to zirconium acetate as zirconia is in the range between about 7-20; and
    heating said zirconium acetate/glacial acetic acid solution in a pressure capable container under hydrothermal conditions to a temperature of at least 160° C., thereby forming a zirconia sol.

2. The process according to claim 1, wherein zirconium acetate is present in said zirconium acetate/glacial acetic acid solution in an amount in the range between about 0.1 to about 0.8 moles/liter based on zirconia.

3. The process according to claim 1, wherein said heating step occurs for a period in the range between about 60-300 minutes.

4. The process according to claim 1, wherein said zirconium acetate/glacial acetic acid solution is heated in a glass-lined, pressure capable container.

5. The process according to claim 1, wherein said heating step is followed by cooling said zirconia sol to ambient temperature.

6. The process according to claim 5, wherein said cooling step is followed by diafiltration of said zirconia sol, whereby unreacted zirconium acetate, unwanted ionic species and excess glacial acetic acid are removed.

7. The process according to claim 6, wherein said diafiltration step is followed by ultrafiltration of said zirconia sol, whereby a concentrated zirconia sol is produced.

8. The process according to claim 7, wherein said zirconia sol is concentrated to a weight percent greater than 30.

9. The process according to claim 1, wherein said diluted solution of glacial acetic acid is a mixture of glacial acetic acid and deionized water.

10. The process according to claim 1, wherein said zirconium acetate is formed from a zirconium salt containing a removable anion.

11. The process according to claim 10, wherein said zirconium salt is either acidic or basic derived zirconium carbonate.

12. A process for producing a monodispersed zirconia sol having a polydispersity less than 0.06, an average particle size in the range between about 60-100 nanometers, and wherein said particles are an aggregate of subunits having an average size in the range between about 2-3 nanometers comprising the following steps:
    mixing zirconium acetate, said zirconium acetate being formed from a zirconium salt containing a removable anion, with a diluted solution of glacial acetic acid to form a composition consisting essentially of zirconium acetate/glacial acetic acid solution, wherein the ratio of the molar concentrations of glacial acetic acid to zirconium acetate as zirconia is in the range between about 10-20 and the molar concentration of zirconium acetate based on zirconia is in the range between about 0.20-0.65, and wherein the combination of said ratio of the molar concentrations of glacial acetic acid to zirconium acetate as zirconia and said molar concentration of zirconium acetate based on zirconia falls within the desired boundaries on the response surface as statistically generated for the data in table 4, said desired boundaries comprising said ratio of molar concentrations of glacial acetic acid to zirconium acetate as zirconia in the range between about 10-20 and the molar concentration of zirconium acetate based on zirconia in the range between about 0.20-0.65; and
    heating said zirconium acetate/glacial acetic acid solution in a pressure capable container under hydrothermal conditions to a temperature of at least 160° C., thereby forming a monodispersed zirconia sol with a polydispersity less than 0.06 and a particle size in the range between about 60-100 nanometers.

13. The process according to claim 12, wherein said zirconium salt is acidic derived zirconium carbonate.

14. The process according to claim 12, wherein zirconium acetate is present in an amount of about 0.53M based on zirconia, the ratio of glacial acetic acid t zirconium acetate as zirconia is about 11.5, and the heating is conducted at 160-165° C. for a period of about 300 minutes.

15. The process according to claim 12, wherein said zirconia sol comprises predominantly monoclinic zirconia.

16. A zirconia sol having a polydispersity in the range between about 0.03-0.30, an average particle size int he range between about 60-225 nanometers, and wherein said particles are an aggregate of subunits having an average size in the range between about 2-3 nanometers, which is formed in accordance with a process comprising the following steps:
    mixing zirconium acetate with a dilute solution of glacial acetic acid to form a composition consisting essentially of zirconium acetate/glacial acetic acid solution, wherein the ratio of the molar concentrations of glacial acetic acid to zirconium acetate as zirconia is in the range between about 7-20 and the molar concentration of zirconium acetate based on zirconia is in the range between about 0.1-0.8; and
    heating said zirconium acetate/glacial* acetic acid solution in a pressure capable container under hydrothermal conditions to a temperature of at least 160° C., thereby forming a zirconia sol.

17. The zirconia sol according to claim 16, wherein said zirconium acetate is formed from a zirconium salt containing a removable anion.

18. The zirconia sol according to claim 17, wherein said zirconium salt is higher acidic or basic derived zirconium carbonate.

19. A monodispersed zirconia sol having a polydispersity less than 0.06, an average particle size in the range between about 60-100 nanometers, and wherein said particles are an aggregate of subunits having an average size in the range between about 3-3 nanometers comprising the following steps:
    mixing zirconium acetate, said zirconium acetate being formed form a zirconium salt containing a removable anion, with a diluted solution of glacial acetic acid to form a composition consisting essentially of zirconium acetate/glacial acetic acid solution, wherein the ratio of the molar concentrations of glacial acetic acid to zirconium acetate as zirconia is in the range between about 10-20 and the molar concentration of zirconium acetate based on zirconia is in the range between about 0.20-0.65, and wherein the combination of said ratio of the molar concentrations of glacial acetic acid to zirconium acetate as zirconia and said molar concentrations of zirconium acetate based on zirconia falls within te desired boundaries on the response surface as statistically generated from the data in table 4, said desired boundaries comprising said ratio of molar concentrations of glacial acetic acid to zirconium acetate as zirconia in the range between about 10-20 and the molar concentration of zirconium acetate based on zirconia in the range between about 0.20-0.65; and
    heating said zirconium acetate/glacial acetic acid solution in a pressure capable container under hydrothermal conditions to a temperature of at least 160° C., thereby forming a monodispersed zirconia sol with polydispersity less than 0.06 and a particle size in the range between about 60-100 nanometers.

20. The zirconia sol according to claim 19, wherein said zirconium salt is acidic derived zirconium carbonate.

* * * * *